United States Patent Office 3,804,811
Patented Apr. 16, 1974

3,804,811
SHAPED ARTICLES FROM RECONSTITUTED POLYESTER
Selwyn H. Rose, Beachwood, James T. K. Woo, Mentor on the Lake, and J. Scott Thornton, Chagrin Falls, Ohio, assignors to Horizons Incorporated, a Division of Horizons Research Incorporated
Filed Apr. 12, 1972, Ser. No. 243,258
Int. Cl. C08g 17/06, 53/22
U.S. Cl. 260—75 T       9 Claims

ABSTRACT OF THE DISCLOSURE

A procedure for up-grading clean polyester material involving maintaining the material at a temperature in the range from 200 to 235° C. in a controlled atmosphere whereby the moldability and the strength and ductility of the resulting product are greatly improved as compared with the same properties of the initial material.

---

Figure 1:
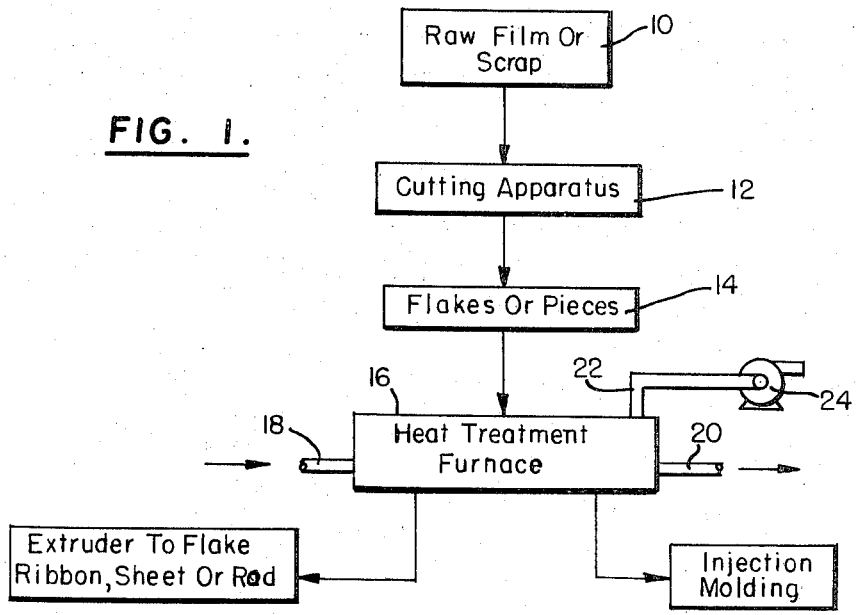

This invention relates to a material for making shaped articles and to a process for producing the material, starting from used or scrap clean polyester film. The material produced can be extruded into rods, tubes, and sheets; drawn to filaments and fibers; and injection molded or compression molded into various useful articles, and possesses greatly improved physical properties as compared with the clean polyester film starting material.

As is becoming more and more apparent, synthetic resin plastics appearing in solid waste create a multitude of disposal problems. Currently, it has been estimated that about 380 billion pounds of solid waste are collected annually in the United States. The percentage of plastic waste is estimated to be about 2% of the total solid waste. However, the proportion of plastic waste in the total solid wastes presented for disposal, is increasing at a rate much faster than the overall increase in the total of solid wastes. A large amount of energy is utilized in the synthesis of such resins and plastics. Further, each synthetic resin waste presents its own disposal problem. For example, burning or incineration of polyvinylchloride waste is objectionable because it produces noxious and corrosive HCl. Other synthetic resins have been found to resist biodegradation and hence remain in their original form whether deposited as land fill or in the oceans. Such wastes accumulate and represent solid pollutants. Recycling of waste synthetic resinous plastics is very desirable because it reduces such pollution and it conserves limited natural resources.

The present invention is directed to the improvement of polyethylene terephthalate recovered from cleaned, used photographic films, X-ray films, magnetic recording tapes, magnetic memory cards, punched computer tapes, typewriter ribbons, wire and cable insulation, packaging films, pressure sensitive tapes, gaskets, spacers, metallic yarn, ticker tape, graphic art films, pipe wrap, stationery supplies, or from any other suitable source including unused polyethylene terephthalate sources.

Prior to the present invention, few attempts to recover and recycle the used polyester film have been made because the recovered polyester was not amenable to conversion into useful articles—previous attempts to make useful shaped articles from used polyester film having been unsuccessful because of low strength and brittleness of the as-formed material.

One object of this invention is to produce a material for making shaped articles by a process which improves the material to the point that it is no longer weak and brittle, and has many other desirable properties.

The process for improving the used polyethylene terephthalate starts with clean material such as that produced by stripping the photosensitive coating from a polyester base by known procedures, for example, as described in U.S. Pat. 3,647,422, issued Mar. 7, 1972.

Figure 2:
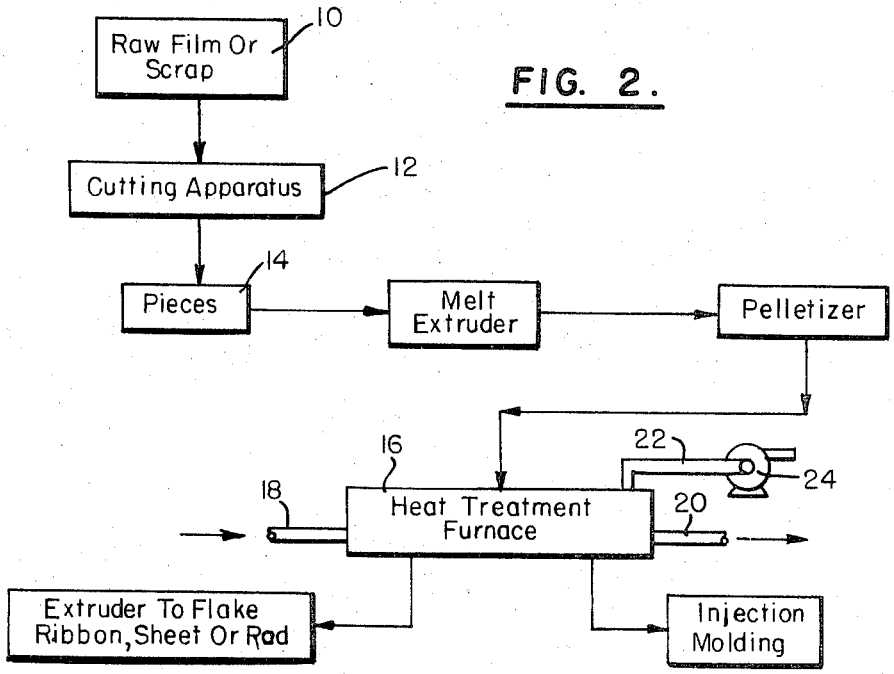

The invention will be more fully described in the description which follows and in the two figures accompanying this application, in which:

FIG. 1 is in the form of a flow sheet illustrating the procedural steps in a preferred embodiment of the process, and FIG. 2 is a flow sheet illustrating a modification of the process of FIG. 1.

As shown schematically in FIG. 1 the starting film or scrap 10 is cut, shredded, granulated or chopped by means of any suitable apparatus 12 into free-flowing fairly uniform size flakes or pieces 14. Initial films having thicknesses between 0.1 and 15 mils have been utilized, but thicker or thinner film can be used in the process without difficulty. A convenient size of piece or flake is one having a major dimension less than about 1 inch, ¼ inch pieces being particularly preferred. Powders comprising particles as small as 0.001 inch have also been processed. Materials of mixed sizes can be handled satisfactorily.

The flakes or pieces are transferred to a furnace 16 in which they can be subjected to a controlled temperature under a controlled atmosphere which may be at subatmospheric pressure. Furnace 16 is equipped with means for heating the furnace and with means to control the temperature of the furnace and its contents. Such means are well known and are not shown. Furnace 16 has an inlet 18 for admitting any desired atmosphere, such as nitrogen, argon, helium or other specified gas and an outlet 20 for exhausting gases from the furnace. Another valved outlet 22 is provided for connection to a vacuum pump 24 or other device for maintaining any desired sub-atmospheric pressure in furnace 16.

After the flaked or cut-up scrap has been received in furnace 16, the furnace and its contents are heated to a temperature between about 200 and 235° C. and maintained at that temperature for between 4 and 160 hours. While the chips or flakes are subjected to the temperatures indicated, the furnace may be swept with a flow of a dry inert gas such as nitrogen, argon or helium, introduced in limited quantities through inlet 18 and exhausted through outlet 20 or a vacuum of between 0.001 and 10 mm., preferably between 0.1 and 2 mm., may be maintained by means of the vacuum pump 24.

Furnace 16 is provided with means to agitate the contents, or if convenient, furnace 16 is a rotatable cylinder. The addition of ethylene glycol to the flake material before it is heated in vessel 16 is beneficial to the process but it is not necessary to the improvement of the material.

The variables of temperature, time, vacuum or gas flow rate, and particle size are interrelated and affect the rate and degree of improvement of the material.

Holding the other variables constant, the higher the temperature in the range 200–235° C., the shorter the time to achieve necessary improvement in properties of the material. For longer times at high temperatures the material becomes higher in strength, but a point is reached where the strength is not enhanced and the subsequent moldability is adversely affected.

Increasing the degree of vacuum or the flow rate of gas sweeping the reaction chamber and decreasing the particle size of the polyester material being treated increases the rate at which property enhancement takes place. Practical limits to the extent of enhancement attempted by conrol of vacuum, flow rate, or particle size are set by economics.

While not wishing to be bound by any specific theory of operation it is believed possible that the heat and vacuum applied to the flake results in the expulsion or release of some of the additives previously incorporated into the material and may possibly be sufficient to cause some reorientations to occur in the polyester.

After up-grading by the above described heat treating process, the material is suitable for shaping into useful objects, by any of a number of conventional shaping processes; preferably the flake is melted, extruded into ribbon, sheet, tube or rod shapes which are subsequently pelletized. This pelletized product makes an ideal free-flowing starting material for injection molding or further extrusion.

The up-graded heat treated flake has also been injection molded into the final article.

In order to further enhance the properties and appearance of the improved flake, various solid and liquid additions can be made to the flake material before melt extruding and pelletizing. Additions of 0.1 to 1% by weight of finely divided carbon black has been found to yield a product with a pleasing black glossy appearance and a density much greater than 1.355. Additions of from 0.05 to 4% by weight of talc, titanium dioxide or aluminum oxide or other similar fillers have resulted in material of increased density (greater than accounted for by the greater density of the addition by itself) (see Table IX). Additions of 0.05 to 0.5% of benzophenone have also resulted in increased density. Various coloring agents can be added to control the color of the final shaped article.

It has been found particularly advantageous to mold the up-graded material immediately after heat treatment. If this is not possible it should be stored in water-tight containers until molding, because moisture pickup is detrimental to the molding of the up-graded product. If moisture pickup has occurred, the material should be dried in a forced air oven for at least 2 hours at 100° C. prior to molding.

A modification of the improvement process is shown schematically in FIG. 2 in which clean polyester film is first melted, then extruded, and then pelletized before heat treatment. The pellets should be less than ⅛" in at least one dimension. The heat treatment is similar to that described in the process of FIG. 1 except the duration of the required heat treatment is somewhat longer in order to achieve equivalent results.

The following examples illustrate the various aspects of the invention and are not intended to limit the same.

EXAMPLE 1 (UNIMPROVED MATERIAL)

In this example, 5 pounds of clean, used polyethylene terephthalate X-ray film base was chopped into ¼" flakes and a portion of the flake injection molded into dog-bone shaped tensile specimens. A reciprocating screw injection molding machine with the following conditions was used:

Cylinder temperature, ° C. _____ 260
Mold temperature, ° C. _____ 150
Injection time, seconds _____ 10
Mold time, seconds _____ 30 and a maximum screw speed with an injection pressure of about 400 p.s.i. The tensile strength and elongation of 6 of the best specimens are listed in the following table.

TABLE I.—PROPERTIES OF MOLDED BARS FROM UNIMPROVED MATERIAL

| Sample: | Tensile strength (p.s.i.) | Elongation (percent) |
| --- | --- | --- |
| 1 | 7,990 | 0 |
| 2 | 5,320 | 0 |
| 3 | 6,140 | 0 |
| 4 | 7,230 | 0 |
| 5 | 6,440 | 0 |
| 6 | 5,180 | 0 |

As can be seen from these figures, the samples are very brittle and recovered, cleaned polyester film without improvement has little or no value for making articles of commerce.

The balance of the unimproved flake was extruded into rods which were brittle, as shown by the data in the following table, taken from a sampling of the extrusion product.

TABLE II.—PROPERTIES OF EXTRUDED RODS FROM UNIMPROVED MATERIAL

| Sample: | Tensile strength (p.s.i.) | Elongation (percent) |
| --- | --- | --- |
| 1 | 8,010 | 0 |
| 2 | 6,660 | 0 |
| 3 | 7,300 | 0 |
| 4 | 6,420 | 0 |
| 5 | 7,550 | 0 |
| 6 | 5,860 | 0 |

The extruder used was a 1" single phase laboratory scale extruder. The temperature of the cylinder for extrusion was 260–270° C. Total residence time for the extrusion was about 1½ to 2 minutes and the back pressure was about 400–500 p.s.i. Following the extrusion, the material was pelletized into small pieces on a polygrinder. These pellets were molded in the reciprocating screw injection molding machine using the same conditions as in the first part of this example. Tensile and elongation properties of the molded bars are summarized in Table III.

TABLE III.—PROPERTIES OF MOLDED BARS FROM UNIMPROVED EXTRUDED MATERIAL

| Sample: | Tensile strength (p.s.i.) | Elongation (percent) |
| --- | --- | --- |
| 1 | 7,500 | 0 |
| 2 | 7,320 | 0 |
| 3 | 6,560 | 0 |
| 4 | 6,870 | 0 |
| 5 | 5,370 | 0 |
| 6 | 7,010 | 0 |

The data indicates that the samples are brittle and not suitable for use in most applications.

EXAMPLE 2 (IMPROVED MATERIAL)

Twenty pounds of used, clean polyethylene terephthalate X-ray film base was granulated to an average particle size of ⅛" and vacuum heated in an Abbe one cubic foot laboratory rotary vacuum dryer. After 1 hour, when steady state conditions had been reached, the temperature evened out at 230° C. and the vacuum at 1.5 mm. After 16 hours at steady state conditions, the heating was interrupted and the charge cooled to room temperature. The cool down time was about 30 minutes.

A portion of the improved flake materials was directly injection molded to dog-bone shaped tensile specimens. A reciprocating screw injection molding machine with the following molding conditions was used:

Cylinder temperature, ° C. _____ 275
Mold temperature, ° C. _____ 150
Injection time, seconds _____ 10
Mold time, seconds _____ 30 and a maximum screw speed with an injection pressure of about 1000 p.s.i. The tensile strength and elongation of 6 samples are indicated in Table IV.

TABLE IV.—PROPERTIES OF MOLDED BARS FROM IMPROVED MATERIAL

| Sample: | Tensile strength (p.s.i.) | Elongation (percent) |
| --- | --- | --- |
| 1 | 10,650 | 275 |
| 2 | 10,300 | 260 |
| 3 | 10,430 | 255 |
| 4 | 10,710 | 244 |
| 5 | 10,500 | 265 |
| 6 | 10,600 | 170 |

The balance of the improved flake material was extruded into rods on the laboratory extruder and samples of these rods were again tough and ductile. The conditions for extrusion were as follows:

Cylinder temperature, ° C. _____ 275
Residence time, minutes (low speed) _____ 2⅓
Back pressure, p.s.i. _____ 1500–2000

The tensile and elongation properties of these rods are summarized in Table V.

TABLE V.—PROPERTIES OF EXTRUDED RODS FROM IMPROVED MATERIALS

| Sample: | Tensile strength (p.s.i.) | Elongation (percent) |
|---|---|---|
| 1 | 10,200 | 310 |
| 2 | 10,310 | 305 |
| 3 | 10,010 | 270 |
| 4 | 10,200 | 250 |
| 5 | 10,450 | 290 |
| 6 | 10,360 | 280 |

The extruded rods after pelletizing to about ⅛" particle size were injection molded into tensile bars using the reciprocating screw injection molding machines as described earlier in this example. The data is summarized in Table VI.

TABLE VI.—PROPERTIES OF MOLDED BARS FROM EXTRUDED IMPROVED MATERIAL

| Sample: | Tensile strength (p.s.i.) | Elongation (percent) |
|---|---|---|
| 1 | 10,780 | 270 |
| 2 | 10,810 | 305 |
| 3 | 10,650 | 210 |
| 4 | 10,430 | 150 |
| 5 | 10,550 | 300 |
| 6 | 10,500 | 290 |

Additional samples were molded from the same batch and additional testing performed. Some of the typical properties of the improved material are listed in Tables VII and VIII.

TABLE VII

Other properties of the improved material

| Property | Value |
|---|---|
| Flexural yield strength (ASTM D–790), p.s.i. | 16,700 |
| Flexural modulus (ASTM D–790), p.s.i. | 401,000 |
| Compressive strength (ASTM D–695), p.s.i. | 14,500 |
| Heat deflection temperature (ASTM D–648) 266 p.s.i., °C. | 85 |
| Izod impact resistance (ASTM D–256) notched, ft. lb./in. | 0.8 |
| Abrasion resistance (ASTM D–1044) Taber CS–17/1000 gm. load, gm./1000 rev. | 0.003 |
| Shore D hardness (ASTM D–1706) | 84 |
| Dielectric strength (ASTM D–149), v./mil | 400 |
| Insulation resistance (ASTM D–257), ohm | >$10^{14}$ |
| Dissipation factor tan δ (ASTM D–150) at 1 mHz./s. | 0.0208 |
| Moisture absorption equilibrium at 23° C. and 65% RH (ASTM D–570), percent | 0.26 |

TABLE VIII.—CHEMICAL PROPERTIES OF THE IMPROVED MATERIAL

| | Temp. (°C.) | Change of weight | | Reduction in yield strength | |
|---|---|---|---|---|---|
| | | 1 week | 8 weeks | 1 week | 8 weeks |
| Tap water | 20 | No | No | Negligible | Negligible. |
| Do | 80 | No | No | do | Do. |
| Gasoline | 20 | No | No | do | Do. |
| Toluene | 20 | No | No | do | Do. |
| Brake fluid | 80 | No | No | do | Do. |
| 40% nitric acid | 20 | No | No | do | Do. |
| 30% sulfuric acid | 20 | No | No | do | Do. |
| Do | 80 | No | No | do | Some. |

EXAMPLE 3

To illustrate the effect of mold conditions on the final properties, a number of specimens were made from the extruded-pelletized material of Example 2 under various molding conditions. The average properties of some of these are reported in Table IX. The most important variable is the mold temperature. At temperatures much below 300° F., the strength is decreased and the ductility greatly increased. Specific gravity of the material obtained from mold temperature less than 220° F. is of the order of 1.35 or less, and the material obtained from mold temperature of greater than 270° F. has specific gravity in the order of 1.355 or greater.

TABLE IX

| Run number | No. of samples | Cylinder temp. (°F.) | Mold temp. (°F.) | Injection Pressure (p.s.i.) | Injection Time (sec.) | Mold time (sec.) | Tensile strength (p.s.i.) | Elongation (percent) | Specific gravity |
|---|---|---|---|---|---|---|---|---|---|
| A | 6 | 540 | 100 | 1,000 | 10 | 10 | 7,250 | 285 | 1.340 |
| B | 6 | 530 | 150 | 1,000 | 10 | 40 | 8,320 | 260 | 1.345 |
| C | 6 | 530 | 220 | 1,000 | 10 | 20 | 8,870 | 260 | 1.351 |
| D | 3 | 520 | 300 | 1,000 | 10 | 20 | 10,320 | 280 | 1.361 |
| E | 3 | 530 | 300 | 1,000 | 10 | 20 | 10,700 | 260 | 1.359 |
| F | 3 | 540 | 280 | 1,000 | 10 | 20 | 10,600 | 250 | 1.357 |
| G | 5 | 530 | 270 | 1,000 | 20 | 20 | 10,200 | 260 | 1.356 |
| H | 5 | 530 | 300 | 900 | 20 | 45 | 10,700 | 270 | 1.360 |
| I | 5 | 530 | 300 | 900 | 10 | 60 | 10,800 | 270 | 1.361 |
| J [1] | 4 | 540 | 300 | 1,400 | 10 | 40 | 10,160 | 305 | 1.395 |
| K [2] | 4 | 530 | 300 | 1,000 | 10 | 40 | 10,750 | 280 | 1.370 |

[1] 4% TiO₂ added.  [2] 1% carbon black added.

EXAMPLE 4

The improved material from Example 2 as extruded was subsequently drawn to a filament at 160° C. and heat set at 120° C. An average of 5 tests gave a fiber of tenacity at 6.5 g./denier which indicates that the material is of the high strength and tenacity caliber.

EXAMPLE 5

To illustrate material improvement by various conditions of heat treatment and with different starting material, a number of experiments were run. The results of some of these are reported in Table X.

TABLE X

| Expt. No. | Furnace | Batch size (lbs.) | Atm. (mm.) | Temp. (°C.) | Time (hrs.) | Improvement [1] |
|---|---|---|---|---|---|---|
| 1826-01 | Stationary | 2 | 1.8 | 235 | 16 | Yes. |
| 1826-02 | do | 2 | 1.8 | 200 | 8 | Slight. |
| 1826-03 | do | 2 | .1 | 235 | 8 | Yes. |
| 1826-07 | do | 2 | .1 | 200 | 16 | Yes. |
| 1826-08 | do | 2 | N₂, 20 | 235 | 16 | Yes. |
| 1832-27 | Rotating | 20 | 1.5 | 230 | 16 | Yes. |
| 1832-28 | do | 20 | 1.0 | 200 | 16 | Yes. |
| 1832-29 | do | [2] 20 | N₂ | 235 | 16 | Yes. |
| 1832-31 | Stationary | [2] 2 | N₂ | 230 | 16 | Yes. |
| 1856-07 | do | 2 | 0.1 | 230 | 2 | No. |
| 1856-08 | do | 2 | 0.1 | 230 | 6 | Yes. |
| 1856-09 | do | 2 | 0.1 | 230 | 8 | Yes. |
| 1856-10 | do | 2 | 0.1 | 230 | 60 | Yes.[3] |

[1] Improvement in tensile properties of injection molded samples: Yes=more than 80% samples 10,000 p.s.i., 100% elongation; Slight= less than 20% of samples 10,000 p.s.i., 100% elongation.
[2] Under a stream of nitrogen gas at atmospheric pressure.
[3] Difficult to mold—samples would not fill mold cavity.

It will be seen that the product of this invention has excellent mechanical properties with a tensile strength greater than 10,000 pounds per square inch, an elongation of 100 to 300%, a compressive strength greater than 14,500 p.s.i., a flexural yield strength greater than 16,700 p.s.i. and a flexural modulus of 400,000 p.s.i. The material also has excellent corrosion resistance, heat resistance, abrasion resistance, dimensional stability and electrical properties.

We claim:
1. A process for improving clean, polyethylene terephthalate polyester which consists of:
   (1) providing a charge consisting essentially of said material in the form of small pieces which when molded into shaped articles under heat and pressure results in molded articles exhibiting less than about 8000 p.s.i. tensile strengths and 0% elongation; and

(2) maintaining said material under vacuum of 0.001 to 10 mm. for a period of time between 4 and 60 hours and at a temperature between about 200° C. and about 235° C., to convert said pieces of polyethylene terephthalate to a material which is suitable for molding into shaped articles with tensile strengths greater than about 10,000 p.s.i. and elongations greater than about 100%.

2. The process of claim 1 but wherein the material is maintained under an inert atmosphere at reduced pressure during said heating.

3. The process of claim 1 wherein the heating is carried out under a stream of inert gas at atmospheric pressure.

4. The process of claim 1 wherein the material is first prepared in the form of flakes 2 to 7 mils thick and then heated in a vacuum of 0.1 to 2 mm.

5. The process of claim 1 wherein the material is a powder.

6. The process of claim 1 wherein the material is in the form of thin strands.

7. The process of claim 1 wherein the material is first prepared in the form of small pellets having at least one dimension not greater than ⅛ inch.

8. The process of claim 1 including the steps of extruding and pelletizing the clean polyester prior to heat treatment of the same.

9. The process of claim 1 including the addition of a liquid or solid additive to the heat treated polyester.

References Cited
UNITED STATES PATENTS

| | | | |
|---|---|---|---|
| 3,344,091 | 9/1967 | Russin et al. | 260—2.3 |
| 3,701,741 | 10/1972 | Meyer et al. | 260—2.3 |

WILBERT J. BRIGGS, Sr., Primary Examiner

U.S. Cl. X.R.

260—2.3